United States Patent
Chen et al.

(10) Patent No.: US 6,721,876 B1
(45) Date of Patent: *Apr. 13, 2004

(54) BRANCH PREDICTOR INDEX GENERATION USING VARIED BIT POSITIONS OR BIT ORDER REVERSAL

(75) Inventors: I-Cheng K. Chen, Sunnyvale, CA (US); Francis M. Matus, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/578,954

(22) Filed: May 25, 2000

(51) Int. Cl.⁷ .............................. G06F 7/00; G06F 15/00
(52) U.S. Cl. ...................................... 712/239; 712/240
(58) Field of Search ................................ 712/239, 240

(56) References Cited

U.S. PATENT DOCUMENTS

| | | | |
|---|---|---|---|
| 5,758,142 A | | 5/1998 | McFarling et al. |
| 5,978,909 A | | 11/1999 | Lempel |
| 5,995,716 A | * | 11/1999 | Harrington et al. .......... 358/1.9 |
| 6,081,887 A | * | 6/2000 | Steely et al. ................ 712/239 |
| 6,408,374 B1 | * | 6/2002 | Calamvokis et al. ....... 711/216 |
| 6,501,608 B2 | * | 12/2002 | Buch ............................ 360/48 |

OTHER PUBLICATIONS

McFarling, "Combining Branch Predictors," WRL Technical Note TN–36, Jun. 1993, pp. 1–20.
Leibholz et al., The Alpha 21264: A 500 MHz Out-of-Order Execution Microprocessor, © 1997 IEEE, pp. 28–36.
Chang et al., "Target Prediction for Indirect Jumps," © 1997 ACM, pp. 274–283.
Driesen et al, "Accurate Indirect Branch Prediction," © 1998 IEEE, pp. 167–168.
Driesen et al, "The Cascaded Predictor: Economical and Adaptive Branch Target Prediction," © 1998 IEEE, pp. 249–258.

* cited by examiner

Primary Examiner—Eddie Chan
Assistant Examiner—Charles Harkness
(74) Attorney, Agent, or Firm—Lawrence K. Merkel; Meyertons, Hood, Kivlin, Kowert & Goetzel, P.C.

(57) ABSTRACT

An indirect branch predictor includes a buffer storing branch target addresses corresponding to previously executed indirect branch instructions. The buffer is indexed with an index derived from history information corresponding to previously predicted indirect branch instructions and from the PC of the particular indirect branch instruction being predicted. In one embodiment, the buffer may be tagless and/or direct mapped. In various embodiments, the indirect branch target predictor may generate the index to the buffer using one or more techniques to improve the accuracy of the prediction: (i) offsetting the history information from the various previously predicted indirect branch instructions; (ii) weighting the history information based on the age of the previously predicted indirect branch instructions; and/or (iii) reversing the bit order of the PC of the particular indirect branch instruction being predicted. In one embodiment, the indirect branch predictor may include a second buffer indexed by a portion of the PC of the particular indirect branch instruction being predicted. The second buffer may store target addresses corresponding to previously executed indirect branch instructions and prediction selection information which may be used to select a target address prediction from one of the buffer and the second buffer. The second buffer may accurately predict indirect branch instructions whose target addresses are relatively fixed, using the buffer indexed by history information to predict the indirect branch instructions having more frequently changing indirect targets.

16 Claims, 9 Drawing Sheets

BRANCH PREDICTOR INDEX GENERATION USING VARIED BIT POSITIONS OR BIT ORDER REVERSAL

BACKGROUND OF THE INVENTION

1. Field of the Invention

This invention is related to the field of processors and, more particularly, to branch prediction mechanisms in processors.

2. Description of the Related Art

Superscalar processors may achieve high performance by executing multiple instructions per clock cycle and by choosing the shortest possible clock cycle consistent with the design. As used herein, the term "clock cycle" refers to an interval of time accorded to various stages of an instruction processing pipeline within the processor. On the other hand, superpipelined processors may achieve high performance by implementing numerous stages in the instruction processing pipeline and overlapping execution of a large number of instructions using the numerous stages.

An important feature of a superscalar or superpipelined processor is its branch prediction mechanism. The branch prediction mechanism indicates a predicted direction (taken or not-taken) for a branch instruction and/or a predicted target address, allowing subsequent instruction fetching to continue within the predicted instruction stream indicated by the branch prediction. Instructions from the predicted instruction stream may be speculatively executed prior to execution of the branch instruction, and/or may be placed into the instruction processing pipeline prior to execution of the branch instruction. If the predicted instruction stream is correct, then the average number of instructions executed per clock cycle is advantageously increased. However, if the predicted instruction stream is incorrect (i.e. one or more branch instructions are predicted incorrectly), then the instructions from the incorrectly predicted instruction stream are discarded from the instruction processing pipeline and the number of instructions executed per clock cycle is decreased.

A branch instruction is an instruction which causes subsequent instructions to be fetched from one of at least two addresses: a sequential address identifying an instruction stream beginning with instructions which directly follow the branch instruction; and a target address identifying an instruction stream beginning at an arbitrary location in memory. The target address may be generated from: (i) either the instruction address of the branch instruction or the instruction sequential to the branch instruction (where the instruction address is the memory address at which the instruction is stored, and is often referred to as the program counter address, or PC); and/or (ii) one or more operands of the instruction. Unconditional branch instructions always branch to the target address, while conditional branch instructions may select either the sequential or the target address based on the outcome of a prior instruction. Branch instructions may also be categorized as direct or indirect. Direct branch instructions generate a target address from at most a displacement encoded into the instruction and the instruction address, and thus do not require an operand fetch to generate the target address. Indirect branch instructions require at least one operand fetch (e.g. from a register or a memory location) to generate the target address.

Accurately predicting indirect branch instructions has become increasingly important. Indirect branch instructions are typically more prevalent in object-oriented programming styles (e.g. Java, C++, etc.). For example, class member functions are typically called using indirect branch instructions.

When predicting indirect branch instructions, the target address is predicted since the target address cannot be calculated without fetching the operands of the branch instruction. Since the operands are in registers or memory locations, the operands may be changed between various executions of a particular indirect branch instruction and thus the target address of the particular indirect branch instruction may change from execution to execution. The target address resulting from an execution of the particular indirect branch instruction may be correlated to the previously encountered branch instructions (in other words, the target address may be correlated with the instructions executed prior to execution of the particular indirect branch). An indirect branch predictor, designed with cost of implementation and accuracy of prediction as design goals and taking into account the correlation that may exist between the target address of the particular indirect branch instruction and previously encountered branch instructions, is desired.

SUMMARY OF THE INVENTION

The problems outlined above are in large part solved by an indirect branch target predictor as described herein. The indirect branch predictor includes a buffer storing branch target addresses corresponding to previously executed indirect branch instructions. The buffer is indexed with an index derived from history information corresponding to previously predicted indirect branch instructions (e.g. a portion of the predicted target address corresponding to previously predicted indirect branch instructions may be used) and from the PC of the particular indirect branch instruction being predicted. The target address from the indexed entry may be used as the prediction for the particular indirect branch instruction. In one embodiment, the buffer may be tagless, thereby reducing cost by eliminating storage for the tags. Additionally, the buffer may be direct mapped in one embodiment, which may reduce power consumption during access to the buffer. In various embodiments, the indirect branch target predictor may generate the index to the buffer using one or more techniques to improve the accuracy of the prediction.

A first index generation technique involves offsetting the history information from the various previously predicted indirect branch instructions. In other words, bits in the same bit position within the history information corresponding to each previously predicted indirect branch instruction affect different bits of the generated index. By offsetting the history information, the indirect branch target predictor may more accurately reflect the order in which the previously predicted indirect branch instructions occur. Prediction accuracy may be increased for cases in which the order of the previously predicted branch instructions affects the target address generated by a particular indirect branch instruction.

A second index generation technique involves weighting the history information based on the age of the previously predicted indirect branch instructions. The number of bits of history information corresponding to more recently predicted indirect branch instructions used in generating the index may be greater than the number of bits of history information corresponding to less recently predicted indirect branch instructions. Prediction accuracy may be improved for those cases in which the correct prediction is more closely correlated to the more recently predicted indirect branch instructions than to the less recently predicted indirect branch instructions.

A third index generation technique involves reversing the bit order of the PC of the particular indirect branch instruction being predicted. In other words, the most significant bits of the portion of the PC used in generating the index may be used in generating least significant bits of the index, while most significant bits of the history information may be used in generating the most significant bits of the index. For code which exhibits locality, the most significant bits of the PC may be relatively stable at any given point in time. The least significant bits of the PC change for each byte and thus may be a quasi-tag for the indirect branch instruction. The most significant bits of the PC are combined with the most recent bits of the history information, and may thus preserve the most recent history information since the most significant bits of the PC are not changing very frequently. The least significant bits of the PC are combined with the least recent bits of the history information. Accordingly, entries of the buffer indexed by one indirect branch instruction may be more likely to be different than the entries of the buffer indexed by another indirect branch instruction (which may be likely to have different least significant bits). Prediction accuracy may be increased due to the more likely allocation of different entries to different indirect branch instructions.

While the above indexing techniques are described for indirect branch prediction, these techniques may be used for indexing any sort of prediction buffer.

In one embodiment, the indirect branch predictor may include a second buffer indexed by a portion of the PC of the particular indirect branch instruction being predicted. The second buffer may store target addresses corresponding to previously executed indirect branch instructions. Additionally, the second buffer may further store prediction selection information which may be used to select a target address prediction from one of the buffer and the second buffer. In the event of a misprediction, both buffers may be updated and the prediction selection information may be changed to select the opposite buffer to the buffer currently selected by the prediction selection information. Since no history information is used to index the second buffer, a single entry may be allocable to each indirect branch instruction. The second buffer may accurately predict indirect branch instructions whose target addresses are relatively fixed, using the buffer indexed by history information to predict the indirect branch instructions having more frequently changing indirect targets. Since the second buffer may filter the relatively fixed target indirect branch instructions, additional history information may be used to index the buffer (possibly causing a particular indirect branch instruction to occupy more entries in the buffer). Prediction accuracy may thereby be increased. In one embodiment, the second buffer may be tagless and/or direct mapped.

BRIEF DESCRIPTION OF THE DRAWINGS

Other objects and advantages of the invention will become apparent upon reading the following detailed description and upon reference to the accompanying drawings in which.

Figure 1:
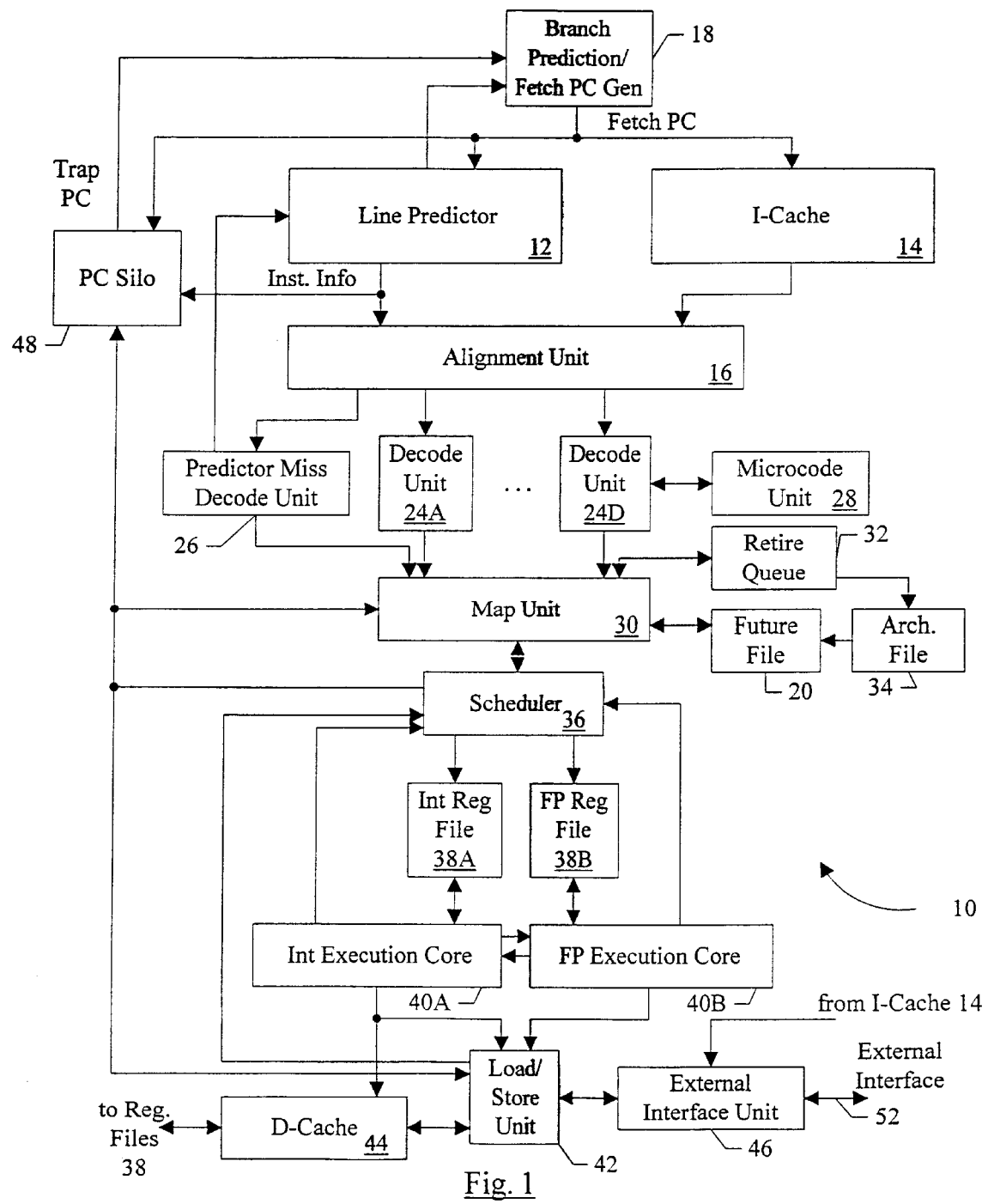
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. In the embodiment of FIG. 1, processor 10 includes a line predictor 12, an instruction cache (I-cache) 14, an alignment unit 16, a branch prediction/fetch PC generation unit 18, a plurality of decode units 24A–24D, a predictor miss decode unit 26, a microcode unit 28, a map unit 30, a retire queue 32, an architectural renames file 34, a future file 20, a scheduler 36, an integer register file 38A, a floating point register file 38B, an integer execution core 40A, a floating point execution core 40B, a load/store unit 42, a data cache (D-cache) 44, an external interface unit 46, and a PC silo 48. Line predictor 12 is coupled to predictor miss decode unit 26, branch prediction/fetch PC generation unit 18, PC silo 48, and alignment unit 16. Line predictor 12 may also be coupled to I-cache 14. I-cache 14 is coupled to alignment unit 16 and branch prediction/fetch PC generation unit 18, which is further coupled to PC silo 48. Alignment unit 16 is further coupled to predictor miss decode unit 26 and decode units 24A–24D. Decode units 24A–24D are further coupled to map unit 30, and decode unit 24D is coupled to microcode unit 28. Map unit 30 is coupled to retire queue 32 (which is coupled to architectural renames file 34), future file 20, scheduler 36, and PC silo 48. Architectural renames file 34 is coupled to future file 20. Scheduler 36 is coupled to register files 38A–38B, which are further coupled to respective execution cores 40A–40B. Execution cores 40A–40B are further coupled to load/store unit 42 and scheduler 36. Execution core 40A is further coupled to D-cache 44. Load/store unit 42 is coupled to scheduler 36, D-cache 44, and external interface unit 46. D-cache 44 is coupled to register files 38. External interface unit 46 is coupled to an external interface 52 and to I-cache 14. Elements referred to herein by a reference numeral followed by a letter will be collectively referred to by the reference numeral alone. For example, decode units 24A–24D will be collectively referred to as decode units 24.

In the embodiment of FIG. 1, processor 10 employs a variable byte length, complex instruction set computing (CISC) instruction set architecture. For example, processor 10 may employ the x86 instruction set architecture (also referred to as IA-32). Other embodiments may employ other instruction set architectures including fixed length instruction set architectures and reduced instruction set computing (RISC) instruction set architectures. Certain features shown in FIG. 1 may be omitted in such architectures. Additionally, any of the above embodiments may employ a 64 bit architecture, if desired.

Branch prediction/fetch PC generation unit 18 is configured to provide a fetch address (fetch PC) to I-cache 14, line predictor 12, and PC silo 48. Branch prediction/fetch PC generation unit 18 may include a suitable branch prediction mechanism used to aid in the generation of fetch addresses. In response to the fetch address, line predictor 12 provides alignment information corresponding to a plurality of instructions to alignment unit 16, and may provide a next fetch address for fetching instructions subsequent to the instructions identified by the provided instruction information. The next fetch address may be provided to branch prediction/fetch PC generation unit 18 or may be directly provided to I-cache 14, as desired. Branch prediction/fetch PC generation unit 18 may receive a trap address from PC silo 48 (if a trap is detected) and the trap address may comprise the fetch PC generated by branch prediction/fetch PC generation unit 18. Otherwise, the fetch PC may be generated using the branch prediction information and information from line predictor 12. Generally, line predictor 12 stores information corresponding to instructions previously speculatively fetched by processor 10. In one embodiment, line predictor 12 includes 2K entries, each entry locating a group of one or more instructions referred to herein as a "line" of instructions. The line of instructions may be concurrently processed by the instruction processing pipeline of processor 10 through being placed into scheduler 36.

I-cache 14 is a high speed cache memory for storing instruction bytes. According to one embodiment I-cache 14 may comprise, for example, a 128 Kbyte, four way set associative organization employing 64 byte cache lines. However, any I-cache structure may be suitable (including direct-mapped structures).

Alignment unit 16 receives the instruction alignment information from line predictor 12 and instruction bytes corresponding to the fetch address from I-cache 14. Alignment unit 16 selects instruction bytes into each of decode units 24A–24D according to the provided instruction alignment information. More particularly, line predictor 12 provides an instruction pointer corresponding to each decode unit 24A–24D. The instruction pointer locates an instruction within the fetched instruction bytes for conveyance to the corresponding decode unit 24A–24D. In one embodiment, certain instructions may be conveyed to more than one decode unit 24A–24D. Accordingly, in the embodiment shown, a line of instructions from line predictor 12 may include up to 4 instructions, although other embodiments may include more or fewer decode units 24 to provide for more or fewer instructions within a line.

Decode units 24A–24D decode the instructions provided thereto, and each decode unit 24A–24D generates information identifying one or more instruction operations (or ROPs) corresponding to the instructions. In one embodiment, each decode unit 24A–24D may generate up to two instruction operations per instruction. As used herein, an instruction operation (or ROP) is an operation which an execution unit within execution cores 40A–40B is configured to execute as a single entity. Simple instructions may correspond to a single instruction operation, while more complex instructions may correspond to multiple instruction operations. Certain of the more complex instructions may be implemented within microcode unit 28 as microcode routines (fetched from a read-only memory therein via decode unit 24D in the present embodiment). Furthermore, other embodiments may employ a single instruction operation for each instruction (i.e. instruction and instruction operation may be synonymous in such embodiments).

PC silo 48 stores the fetch address and instruction information for each instruction fetch, and is responsible for redirecting instruction fetching upon exceptions (such as instruction traps defined by the instruction set architecture employed by processor 10, branch mispredictions, and other microarchitecturally defined traps). PC silo 48 may include a circular buffer for storing fetch address and instruction information corresponding to multiple lines of instructions which may be outstanding within processor 10. In response to retirement of a line of instructions, PC silo 48 may discard the corresponding entry. In response to an exception, PC silo 48 may provide a trap address to branch prediction/fetch PC generation unit 18. Retirement and exception information may be provided by scheduler 36. In one embodiment, map unit 30 assigns a sequence number (R#) to each instruction to identify the order of instructions outstanding within processor 10. Scheduler 36 may return R#s to PC silo 48 to identify instruction operations experiencing exceptions or retiring instruction operations.

Upon detecting a miss in line predictor 12, alignment unit 16 routes the corresponding instruction bytes from 1-cache 14 to predictor miss decode unit 26. Predictor miss decode unit 26 decodes the instruction, enforcing any limits on a line of instructions as processor 10 is designed for (e.g. maximum number of instruction operations, maximum number of instructions, terminate on branch instructions, etc.). Upon terminating a line, predictor miss decode unit 26 provides the information to line predictor 12 for storage. It is noted that predictor miss decode unit 26 may be configured to dispatch instructions as they are decoded. Alternatively, predictor miss decode unit 26 may decode the line of instruction information and provide it to line predictor 12 for storage. Subsequently, the missing fetch address may be reattempted in line predictor 12 and a hit may be detected.

In addition to decoding instructions upon a miss in line predictor 12, predictor miss decode unit 26 may be configured to decode instructions if the instruction information provided by line predictor 12 is invalid. In one embodiment, processor 10 does not attempt to keep information in line predictor 12 coherent with the instructions within I-cache 14 (e.g. when instructions are replaced or invalidated in I-cache 14, the corresponding instruction information may not actively be invalidated). Decode units 24A–24D may verify the instruction information provided, and may signal predictor miss decode unit 26 when invalid instruction information is detected. According to one particular embodiment, the following instruction operations are supported by processor 10: integer (including arithmetic, logic, shift/rotate, and branch operations), floating point (including multimedia operations), and load/store.

The decoded instruction operations and source and destination register numbers are provided to map unit 30. Map unit 30 is configured to perform register renaming by assigning physical register numbers (PR#s) to each destination register operand and source register operand of each instruction operation. The physical register numbers identify registers within register files 38A–38B. Map unit 30 additionally provides an indication of the dependencies for each instruction operation by providing R#s of the instruction operations which update each physical register number assigned to a source operand of the instruction operation. Map unit 30 updates future file 20 with the physical register numbers assigned to each destination register (and the R# of the corresponding instruction operation) based on the corresponding logical register number. Additionally, map unit 30 stores the logical register numbers of the destination registers, assigned physical register numbers, and the previously assigned physical register numbers in retire queue 32. As instructions are retired (indicated to map unit 30 by scheduler 36), retire queue 32 updates architectural renames file 34 and frees any registers which are no longer in use. Accordingly, the physical register numbers in architectural register file 34 identify the physical registers storing the committed architectural state of processor 10, while future file 20 represents the speculative state of processor 10. In other words, architectural renames file 34 stores a physical register number corresponding to each logical register, representing the committed register state for each logical register. Future file 20 stores a physical register number corresponding to each logical register, representing the speculative register state for each logical register.

The line of instruction operations, source physical register numbers, and destination physical register numbers are stored into scheduler 36 according to the R#s assigned by map unit 30. Furthermore, dependencies for a particular instruction operation may be noted as dependencies on other instruction operations which are stored in the scheduler. In one embodiment, instruction operations remain in scheduler 36 until retired.

Scheduler 36 stores each instruction operation until the dependencies noted for that instruction operation have been satisfied. In response to scheduling a particular instruction operation for execution, scheduler 36 may determine at which clock cycle that particular instruction operation will update register files 38A–38B. Different execution units within execution cores 40A–40B may employ different numbers of pipeline stages (and hence different latencies). Furthermore, certain instructions may experience more latency within a pipeline than others. Accordingly, a countdown is generated which measures the latency for the particular instruction operation (in numbers of clock cycles). Scheduler 36 awaits the specified number of clock cycles (until the update will occur prior to or coincident with the dependent instruction operations reading the register file), and then indicates that instruction operations dependent upon that particular instruction operation may be scheduled. It is noted that scheduler 36 may schedule an instruction once its dependencies have been satisfied (i.e. out of order with respect to its order within the scheduler queue).

Integer and load/store instruction operations read source operands according to the source physical register numbers from register file 38A and are conveyed to execution core 40A for execution. Execution core 40A executes the instruction operation and updates the physical register assigned to the destination within register file 38A. Additionally, execution core 40A reports the R# of the instruction operation and exception information regarding the instruction operation (if any) to scheduler 36. Register file 38B and execution core 40B may operate in a similar fashion with respect to floating point instruction operations (and may provide store data for floating point stores to load/store unit 42).

In one embodiment, execution core 40A may include, for example, two integer units, a branch unit, and two address generation units (with corresponding translation lookaside buffers, or TLBs). Execution core 40B may include a floating point/multimedia multiplier, a floating point/multimedia adder, and a store data unit for delivering store data to load/store unit 42. Other configurations of execution units are possible, including a combined floating point/integer execution core.

Load/store unit 42 provides an interface to D-cache 44 for performing memory operations and for scheduling fill operations for memory operations which miss D-cache 44. Load memory operations may be completed by execution core 40A performing an address generation and forwarding data to register files 38A–38B (from D-cache 44 or a store queue within load/store unit 42). Store addresses may be presented to D-cache 44 upon generation thereof by execution core 40A (directly via connections between execution core 40A and D-Cache 44). The store addresses are each allocated a store queue entry. The store data may be provided concurrently, or may be provided subsequently, according to design choice. Upon retirement of the store instruction, the data is stored into D-cache 44 (although there may be some delay between retirement and update of D-cache 44). Additionally, load/store unit 42 may include a load/store buffer for storing load/store addresses which miss D-cache 44 for subsequent cache fills (via external interface unit 46) and re-attempting the missing load/store operations. Load/store unit 42 is further configured to handle load/store memory dependencies.

D-cache 44 is a high speed cache memory for storing data accessed by processor 10. While D-cache 44 may comprise any suitable structure (including direct mapped and set-associative structures), one embodiment of D-cache 44 may comprise a 128 Kbyte, 2 way set associative cache having 64 byte lines.

External interface unit 46 is configured to communicate to other devices via external interface 52. Any suitable external interface 52 may be used, including interfaces to L2 caches and an external bus or buses for connecting processor 10 to other devices. External interface unit 46 fetches fills for I-cache 16 and D-cache 44, as well as writing discarded updated cache lines from D-cache 44 to the external interface. Furthermore, external interface unit 46 may perform non-cacheable reads and writes generated by processor 10 as well.

Figure 2:
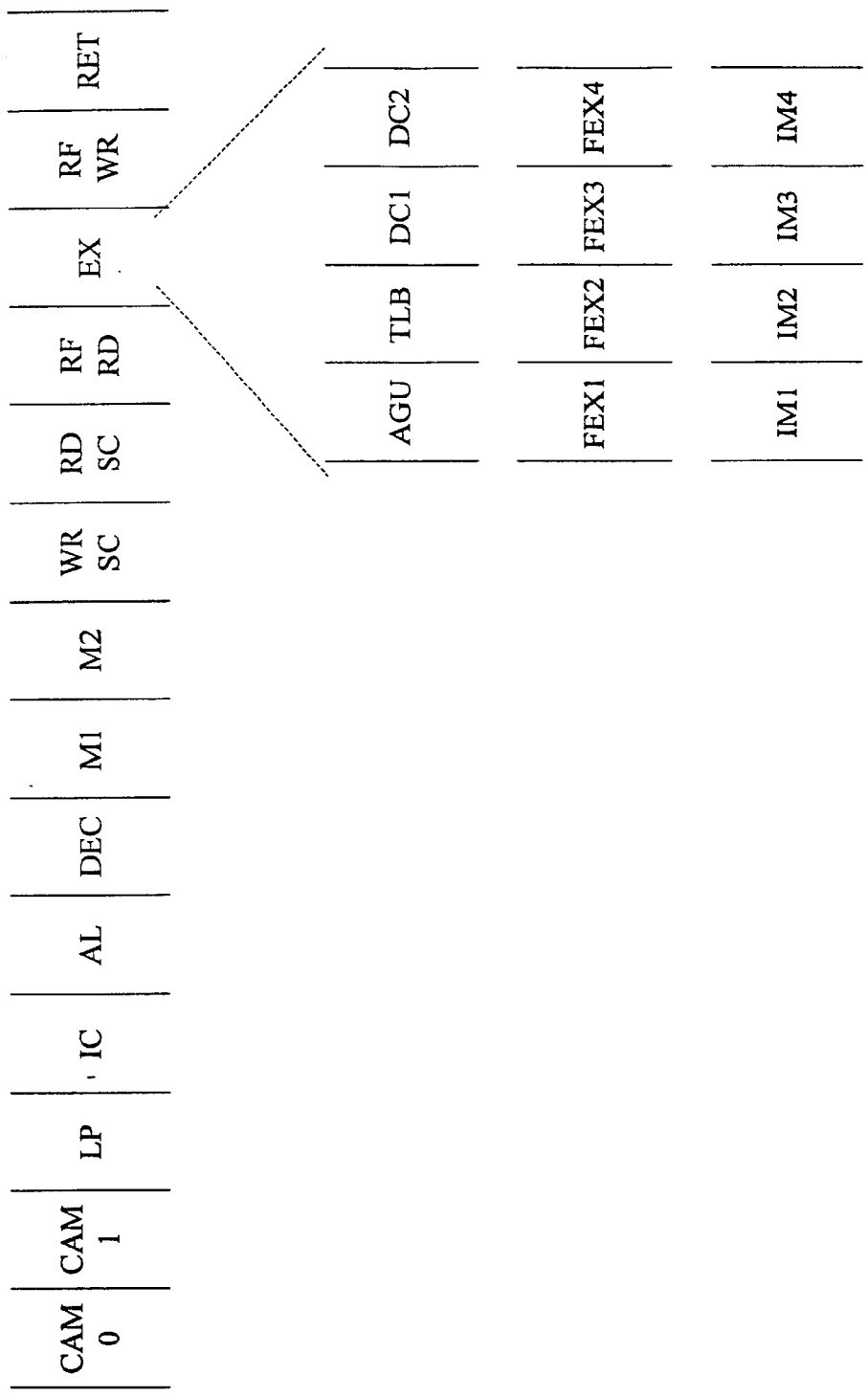
FIG. 2 is a pipeline diagram illustrating exemplary pipeline stages which may be employed by one embodiment of the processor shown in FIG. 1.

Turning next to FIG. 2, an exemplary pipeline diagram illustrating an exemplary set of pipeline stages which may be employed by one embodiment of processor 10 is shown. Other embodiments may employ different pipelines, pipelines including more or fewer pipeline stages than the pipeline shown in FIG. 2. The stages shown in FIG. 2 are delimited by vertical lines. Each stage is one clock cycle of a clock signal used to clock storage elements (e.g. registers, latches, flops, and the like) within processor 10.

As illustrated in FIG. 2, the exemplary pipeline includes a CAM0 stage, a CAM1 stage, a line predictor (LP) stage, an instruction cache (IC) stage, an alignment (AL) stage, a decode (DEC) stage, a map 1 (M1) stage, a map2 (M2) stage, a write scheduler (WR SC) stage, a read scheduler (RD SC) stage, a register file read (RF RD) stage, an execute (EX) stage, a register file write (RF WR) stage, and a retire (RET) stage. Some instructions utilize multiple clock cycles in the execute state. For example, memory operations, floating point operations, and integer multiply operations are illustrated in exploded form in FIG. 2. Memory operations include an address generation (AGU) stage, a translation (TLB) stage, a data cache 1 (DC1) stage, and a data cache 2 (DC2) stage. Similarly, floating point operations include up to four floating point execute (FEX1–FEX4) stages, and integer multiplies include up to four (IM1–IM4) stages.

During the CAM0 and CAM1 stages, line predictor 12 compares the fetch address provided by branch prediction/fetch PC generation unit 18 to the addresses of lines stored therein. Additionally, the fetch address is translated from a virtual address (e.g. a linear address in the x86 architecture) to a physical address during the CAM0 and CAM1 stages. In response to detecting a hit during the CAM0 and CAM1 stages, the corresponding line information is read from the line predictor during the line predictor stage. Also, I-cache 14 initiates a read (using the physical address) during the line predictor stage. The read completes during the instruction cache stage.

It is noted that, while the pipeline illustrated in FIG. 2 employs two clock cycles to detect a hit in line predictor 12 for a fetch address, other embodiments may employ a single clock cycle (and stage) to perform this operation. Moreover, in one embodiment, line predictor 12 provides a next fetch address for I-cache 14 and a next entry in line predictor 12 for a hit, and therefore the CAM0 and CAM1 stages may be skipped for fetches resulting from a previous hit in line predictor 12.

Instruction bytes provided by I-cache 14 are aligned to decode units 24A–24D by alignment unit 16 during the alignment stage in response to the corresponding line information from line predictor 12. Decode units 24A–24D decode the provided instructions, identifying ROPs corresponding to the instructions as well as operand information during the decode stage. Map unit 30 generates ROPs from the provided information during the map 1 stage, and performs register renaming (updating future file 20). During the map2 stage, the ROPs and assigned renames are recorded in retire queue 32. Furthermore, the ROPs upon which each ROP is dependent are determined. Each ROP may be register dependent upon earlier ROPs as recorded in the future file, and may also exhibit other types of dependencies (e.g. dependencies on a previous serializing instruction, etc.)

The generated ROPs are written into scheduler 36 during the write scheduler stage. Up until this stage, the ROPs located by a particular line of information flow through the pipeline as a unit. It is noted that ROPs comprising a microcode routine may be an exception to the aforementioned statement, since they may be read from the microcode ROM over multiple clock cycles. However, subsequent to be written into scheduler 36, the ROPs may flow independently through the remaining stages, at different times. Generally, a particular ROP remains at this stage until selected for execution by scheduler 36 (e.g. after the ROPs upon which the particular ROP is dependent have been selected for execution, as described above). Accordingly, a particular ROP may experience one or more clock cycles of delay between the write scheduler write stage and the read scheduler stage. During the read scheduler stage, the particular ROP participates in the selection logic within scheduler 36, is selected for execution, and is read from scheduler 36. The particular ROP then proceeds to read register file operations from one of register files 38A–38B (depending upon the type of ROP) in the register file read stage.

The particular ROP and operands are provided to the corresponding execution core 40A or 40B, and the instruction operation is performed on the operands during the execution stage. As mentioned above, some ROPs have several pipeline stages of execution. For example, memory instruction operations (e.g. loads and stores) are executed through an address generation stage (in which the data address of the memory location accessed by the memory instruction operation is generated), a translation stage (in which the virtual data address provided by the address generation stage is translated) and a pair of data cache stages in which D-cache 44 is accessed. Floating point operations may employ up to 4 clock cycles of execution, and integer multiplies may similarly employ up to 4 clock cycles of execution.

Upon completing the execution stage or stages, the particular ROP updates its assigned physical register during the register file write stage. Finally, the particular ROP is retired after each previous ROP is retired (in the retire stage). Again, one or more clock cycles may elapse for a particular ROP between the register file write stage and the retire stage. Furthermore, a particular ROP may be stalled at any stage due to pipeline stall conditions, as is well known in the art.

Fetch Address Generation

Figure 3:
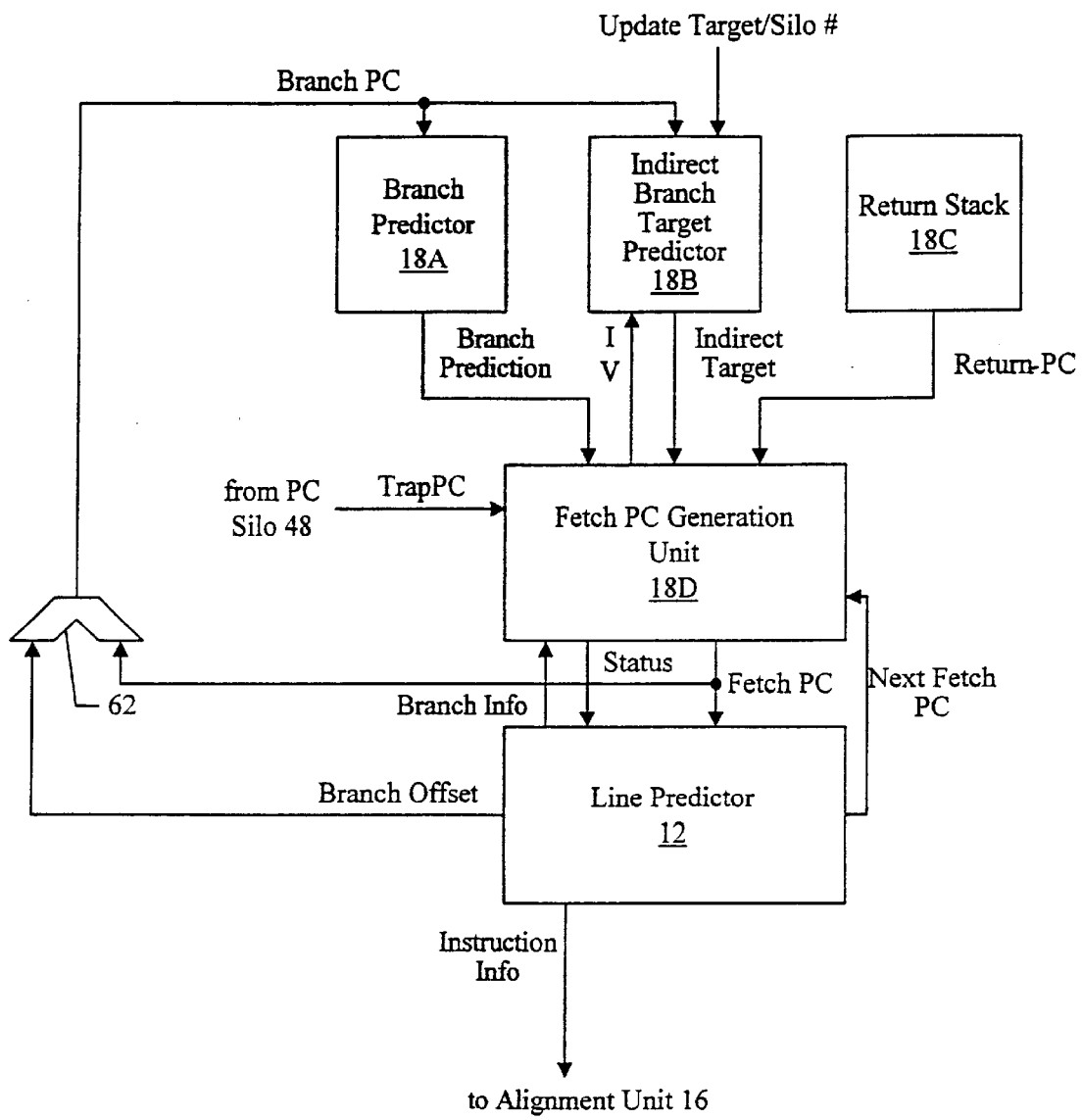
FIG. 3 is a block diagram illustrating one embodiment of a branch prediction, indirect branch target predictor, return state, fetch PC generation unit and line predictor illustrated in FIG. 1.

Turning now to FIG. 3, a block diagram illustrating one embodiment of branch prediction/fetch PC generation unit 18, line predictor 12, and an adder 62 is shown. Other embodiments are possible and contemplated. In the embodiment of FIG. 3, branch prediction/fetch PC generation unit 18 includes a branch predictor 18A, an indirect branch target predictor 18B, a return stack 18C, and fetch PC generation unit 18D. Branch predictor 18A and indirect branch target predictor 18B are coupled to receive the output of adder 62, and are coupled to fetch PC generation unit 18D. Indirect branch target predictor 18B is coupled to receive an update target and silo number. Return stack 18C is coupled to fetch PC generation unit 18D. Fetch PC generation unit 18D is coupled to receive a trap PC from PC silo 48, and is further coupled to line predictor 12 and adder 62. Line predictor 12 is coupled to adder 62.

Generally, fetch PC generation unit 18D generates a fetch instruction address (fetch PC) for instructions to be fetched. The fetch PC is provided to line predictor 12 and adder 62 (as well as PC silo 48, as shown in FIG. 1). Line predictor 12 compares the fetch PC to PCs stored therein to determine if a line predictor entry corresponding to the fetch PC exists within line predictor 12. If a corresponding line predictor entry is found, the instruction pointers stored in the line predictor entry are provided to alignment unit 16. In the present embodiment, each line predictor entry also provides a next fetch instruction address (next fetch PC). The next fetch PC is provided to fetch PC generation unit 18D. The line predictor entry may also include an indication of the next line predictor entry within line predictor 12 (corresponding to the next fetch PC) to allow line predictor 12 to fetch instruction pointers corresponding to the next fetch PC. Accordingly, as long as fetch PCs continue to hit in line predictor 12, fetching of lines of instructions may be initiated from the line predictor stage of the pipeline shown in FIG. 2. Traps initiated by PC silo 48 (in response to scheduler 36) or a disagreement between the prediction made by line predictor 12 for the next fetch PC and the next fetch PC generated by fetch PC generation unit 18D may cause line predictor 12 to search for the fetch PC provided by fetch PC generation unit 18D.

Even while next fetch PCs are being generated by line predictor 12 and are hitting in line predictor 12, fetch PC generation unit 18D continues to generate fetch PCs for logging by PC silo 48. Furthermore, fetch PC generation unit 18D may verify the next fetch PCs provided by line predictor 12 via the branch predictors 18A–18C. The line predictor entries within line predictor 12 identify the terminating instruction within the line of instructions by type, and line predictor 12 transmits the type information to fetch PC generation unit 18D as well as the predicted direction of the terminating instruction (branch info in FIG. 3). Furthermore, for branches forming a target address via a branch displacement included within the branch instruction, line predictor 12 may provide an indication of the branch displacement. For purposes of verifying the predicted next fetch PC, the terminating instruction may be a conditional branch instruction, an indirect branch instruction, or a return instruction.

If the terminating instruction is a conditional branch instruction or an indirect branch instruction, line predictor 12 generates a branch offset from the current fetch PC to the branch instruction by examining the instruction pointers in the line predictor entry. The branch offset is added to the current fetch PC by adder 62, and the address is provided to branch predictor 18A and indirect branch target predictor 18B. Branch predictor 18A is used for conditional branches, and indirect branch target predictor 18B is used for indirect branches.

Generally, branch predictor 18A is a mechanism for predicting conditional branches based on the past behavior of conditional branches. More particularly, the instruction address of the branch instruction (branch PC) is used to index into a table of branch predictions (e.g., two bit saturating counters which are incremented for taken branches and decremented for not-taken branches, and the most significant bit is used as a taken/not-taken prediction). The table is updated based on past executions of conditional branch instructions, as those branch instructions are retired or become non-speculative. In one particular embodiment, two tables are used (each having 16K entries of two bit saturating counters). The tables are indexed by an exclusive OR of recent branch prediction history and the least significant bits of the branch PC, and each table provides a prediction. A third table (comprising 4K entries of two bit saturating selector counters) stores a selector between the two tables, and is indexed by the branch address directly. The selector picks one of the predictions provided by the two tables as the prediction for the conditional branch instruction. Other embodiments may employ different configurations and different numbers of entries. Using the three table structure, aliasing of branches having the same branch history and least significant address bits (but different most significant address bits) may be alleviated.

In response to the branch PC provided by adder 62, branch predictor 18A provides a branch prediction. Fetch PC generation unit 18D compares the prediction to the prediction recorded in the line predictor entry. If the predictions do not match, fetch PC generation unit 18D signals (via status lines shown in FIG. 3) line predictor 12. Additionally, fetch PC generation unit 18D generates a fetch PC based on the prediction from branch predictor 18A (either the branch target address generated in response to the branch displacement, or the sequential address). More particularly, the branch target address in the x86 instruction set architecture may be generated by adding the sequential instruction's PC and the branch displacement. Other instruction set architectures may add the branch PC to the branch displacement.

Indirect branch target predictor 18B is used for indirect branch instructions. While branch instructions which form a target address from the branch displacement have static branch target addresses (at least at the virtual stage, although page mappings to physical addresses may be changed), indirect branch instructions have variable target addresses based on register and/or memory operands. Indirect branch target predictor 18B caches previously generated indirect branch target addresses in a table indexed by the branch PC. Similar to branch predictor 18A, indirect branch target predictor 18B is updated with actually generated indirect branch target addresses upon the retirement of indirect branch target instructions (via the update target and silo number shown in FIG. 3). Thus, the update target may be provided from scheduler 36 or PC silo 48, for example. Additional details of two embodiments of indirect branch target predictor 18B are provided further below.

Fetch PC generation unit 18D receives the predicted indirect branch target address from indirect branch target predictor 18B, and compares the indirect branch target address to the next fetch PC generated by line predictor 12. If the addresses do not match (and the corresponding line predictor entry is terminated by an indirect branch instruction), fetch PC generation unit 18D signals line predictor 12 (via the status lines) that a mismatched indirect branch target has been detected. Additionally, the predicted indirect target address from indirect branch target predictor 18B is generated as the fetch PC by fetch PC generation unit 18D. Line predictor 12 compares the fetch PC to detect a hit and select a line predictor entry.

In one embodiment, indirect branch target predictor 18B uses a history of recently predicted indirect branch instructions in predicting a current indirect branch instruction. Accordingly, fetch PC generation unit 18D may signal indirect branch target predictor 18B if a line is terminated by an indirect branch instruction (IV signal in FIG. 3). Indirect branch target predictor 18B may record history information for the currently predicted indirect branch instruction in response to the asserted IV signal.

Return stack 18C is used to predict target addresses for return instructions. As call instructions are fetched, the sequential address to the call instruction is pushed onto the return stack as a return address. As return instructions are fetched, the most recent return address is popped from the return stack and is used as the return address for that return instruction. Accordingly, if a line predictor entry is terminated by a return instruction, fetch PC generation unit 18D compares the next fetch address from the line predictor entry to the return address provided by return address stack 18C. Similar to the indirect target cache discussion above, if the return address and the next fetch address mismatch, fetch PC generation unit 18D signals line predictor 12 (via the status lines) and generates the return address as the fetch address. The fetch address is searched in line predictor 12 (and translated by ITLB 60 for fetching in I-cache 14).

The above described mechanism may allow for rapid generation of fetch PCs using line predictor 12, with parallel verification of the predicted instruction stream using the branch predictors 18A–18C. If the branch predictors 18A–18C and line predictor 12 agree, then rapid instruction fetching continues. If disagreement is detected, fetch PC generation unit 18D and line predictor 12 may update the affected line predictor entries locally.

Predictor miss decode unit 26 may be configured to access the branch predictors 18A–18C when terminating a line predictor entry with a branch instruction. The corresponding prediction information may be received by predictor miss decode unit 26 to generate next fetch PC information for the generated line predictor entry. For example, if the line predictor entry is terminated by a conditional branch instruction, predictor miss decode unit 26 may use the branch prediction provided by branch predictor 18A to determine whether to use the branch target address or the sequential address as the next fetch PC. The next fetch address may be received from indirect branch target predictor 18B and may be used as the next fetch PC if the line is terminated by an indirect branch instruction. The return address may be used (and popped from return stack 18C) if the line is terminated by a return instruction.

As used herein, an "address" is a value which identifies a byte within a memory system to which processor 10 is couplable. A "fetch address" is an address used to fetch instruction bytes to be executed as instructions within processor 10. As mentioned above, processor 10 may employ an address translation mechanism in which virtual addresses (generated in response to the operands of instructions) are translated to physical addresses (which physically identify locations in the memory system). In the x86 instruction set architecture, virtual addresses may be linear addresses generated according to a segmentation mechanism operating upon logical addresses generated from operands of the instructions. Other instruction set architectures may define the virtual address differently.

It is noted that indirect branch target predictor 18B as illustrated in FIG. 3 is used to verify next fetch PCs provided by line predictor 12. Indirect branch target predictor 18B may also be used in a more traditional construction in which the indirect branch target predictor 18B is used to generate the fetch PC directly upon detection of an indirect branch instruction.

Indirect Branch Target Predictor

Figure 4:
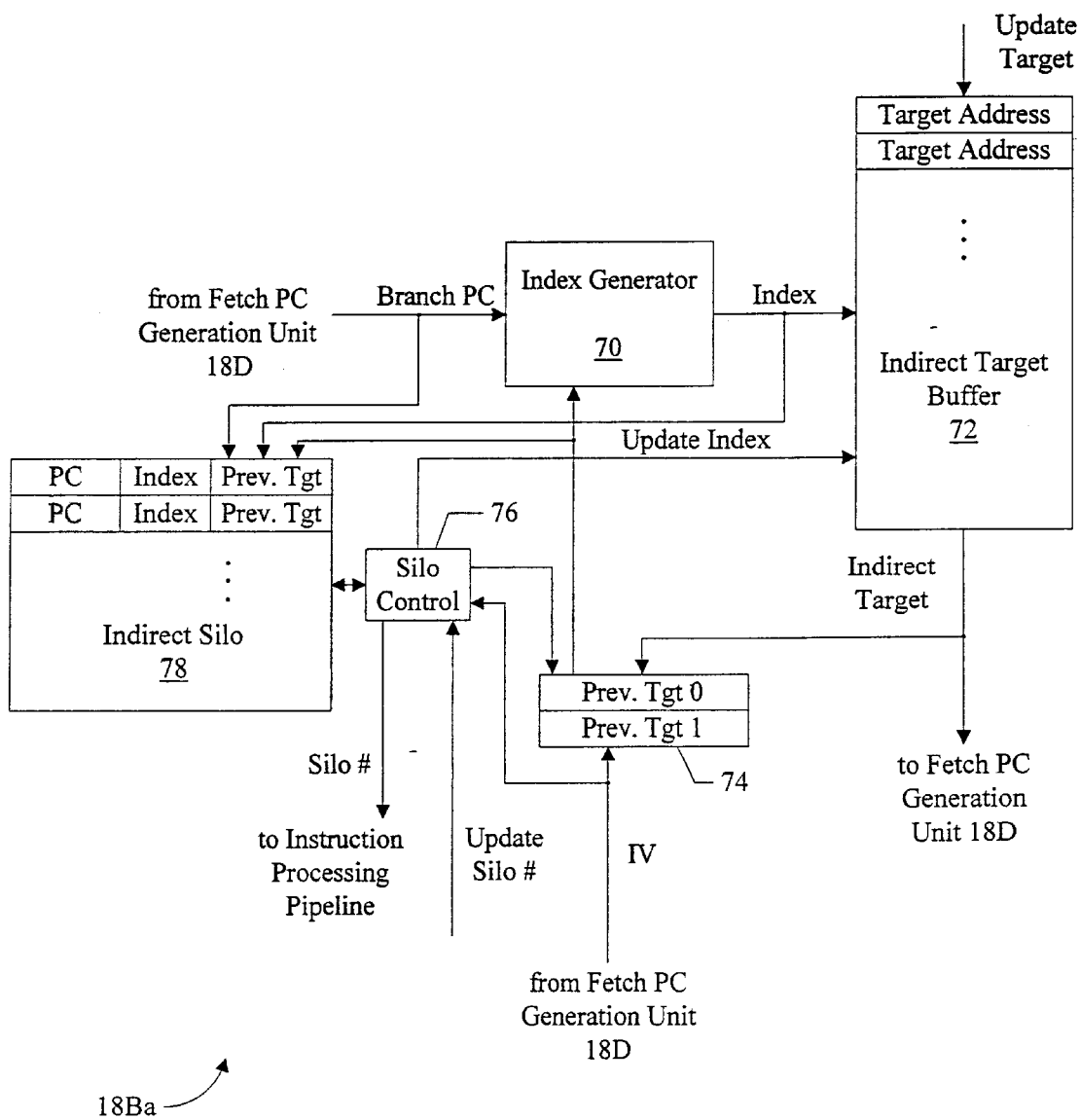
FIG. 4 is a block diagram of one embodiment of the indirect branch target predictor shown in FIG. 3.

Turning next to FIG. 4, a block diagram of a first embodiment of indirect branch target predictor 18B (indirect branch target predictor 18Ba) is shown. Other embodiments are possible and contemplated. In the embodiment of FIG. 4, indirect branch target predictor 18Ba includes an index generator circuit 70, an indirect target buffer 72, a previous target buffer 74, a silo control circuit 76, and an indirect silo 78. Index generator circuit 70 is coupled to receive a Branch PC from fetch PC generation unit 18D and is coupled to previous target buffer 74. Index generator circuit 70 is coupled to provide an index to indirect target buffer 72 and indirect silo 78. Indirect target buffer 72 is coupled to receive an update target and an update index from silo control circuit 76, and is coupled to provide an indirect target to previous target buffer 74 and to fetch PC generation unit 18D. Previous target buffer 74 is coupled to receive an IV ("indirect valid") signal from fetch PC generation unit 18D and is coupled to indirect silo 78 and silo control circuit 76. Silo control circuit 76 is coupled to provide a silo number to the instruction processing pipeline of processor 10 and is coupled to receive an update silo number and the IV signal. Silo control circuit 76 is further coupled to indirect silo 78, which is further coupled to receive the branch PC.

Generally speaking, indirect branch target predictor 18Ba is configured to predict a target address for an indirect branch instruction based on previously generated indirect branch targets. Indirect branch target buffer 72 stores previously generated target addresses (generated during the execution of indirect branch instructions), and a target address is selected therefrom in response to the index from index generator circuit 70. Index generator circuit 70 generates the index responsive to at least a portion of the branch PC of the indirect branch instruction being predicted and responsive to history information corresponding to previously predicted indirect branch instructions (e.g. previous target address information provided by previous target buffer 74). Viewed in another way, the index is derived from the portion of the branch PC and from the history information. Additional details regarding the index generation are provided below in FIG. 5. The predicted indirect target address is output from indirect target buffer 72 to fetch PC generation unit 18D. As used herein, an "index" is a value used to select an entry in a buffer. The contents of the selected entry may be output by the buffer.

By using the history information corresponding to previously predicted indirect branch instructions in the index generation, different entries in indirect target buffer 72 may be selected for the same indirect branch instruction. For example, different entries may be selected for a particular indirect branch instruction if different indirect branch instructions precede the particular indirect branch instruction in the predicted instruction stream fetched by processor 10. In this manner, if the target address of the indirect branch instruction being predicted changes based on different instructions being executed prior to that indirect branch instruction, the different target addresses may be stored in different entries of indirect target buffer 72 and thus the different target addresses may be correctly predicted by indirect branch target predictor 18Ba.

In addition to providing the predicted indirect target address to fetch PC generation unit 18D, indirect branch target buffer 72 provides at least a portion of the predicted indirect target address to previous target buffer 74. Previous target buffer 74 stores target address information corresponding to previously predicted indirect branch instructions (more succinctly referred to as previous target address information). More particularly, previous target buffer 74 may store previous target address information corresponding to the N most recently predicted indirect branch instructions (e.g. the two most recently predicted indirect branch instructions in the illustrated embodiment). For example, previous target buffer 74 may be a first in, first out (FIFO) buffer storing previous target address information. If an indirect branch instruction is encountered (indicated by fetch PC generation unit 18D via assertion of the IV signal), previous target buffer 74 may discard the previous target address information corresponding to the least recent previously predicted indirect branch instruction and may store target address information corresponding to the indirect branch instruction being predicted. In one embodiment, the target address information stored for each indirect branch instruction comprises a plurality of least significant bits of the target address. The previous target address information stored in previous target buffer 74 is provided to index generator 70 to generate the index for selecting a target address prediction for an indirect branch instruction. As used herein, a first indirect branch instruction may be prior to a second indirect branch instruction if the first indirect branch instruction is encountered within the predicted instruction stream fetched by processor 10 before the second indirect branch instruction, and thus is predicted by the indirect branch target predictor before the second indirect branch instruction is predicted.

In the illustrated embodiment, indirect target buffer 72 is a "tagless" buffer. In other words, each entry in the buffer stores a target address, but does not include tag information linking the target address to the branch PC. For example, a portion of the branch PC (or all of the branch PC, if desired) could be used to form a tag in each entry if tags were included. Since the branch PC and history information is used to select an entry (both for update, described below, and for prediction), the target address from the selected entry is likely to correspond to a previous execution of the indirect branch instruction being predicted. However, the target address from the selected entry may correspond to a different indirect branch instruction (having a branch PC and history information in previous target buffer 74 which results in the same index being generated as is generated for the indirect branch instruction being predicted). Rather than providing the storage for tags (and the hardware for checking the tags to ensure that the target address corresponds to the indirect branch instruction being predicted), indirect target buffer 72 uses the target address from the selected entry as the prediction and updates the entry if the prediction is incorrect. If tags were stored and indicated that the target address from the selected entry did not correspond to the indirect branch instruction (and thus indirect branch predictor 18Ba did not provide a target address), instruction fetching may stop because there would be no address to fetch from (or the address may not be verified, in the embodiment of FIG. 3). Instead, providing a relatively large number of entries in indirect target buffer 72 may reduce the probability that a selected entry stores a target address corresponding to a different indirect branch instruction. For example, in one embodiment, indirect target buffer 72 may include 512 entries, each entry storing a target address. The target address may comprise 48 bits, for example. The number of entries and the number of bits in a target address may be varied from embodiment to embodiment.

In the illustrated embodiment, indirect target buffer 72 may be direct mapped (i.e. one entry in the buffer is selected in response to any given index). Direct mapped buffers may be accessed more rapidly than, for example, set associative buffers since no selection among multiple entries corresponding to the index is performed. Additionally, direct mapped buffers may achieve lower power consumption since fewer entries (and thus fewer bits) may be accessed in response to the index. Other embodiments may employ other buffer structures, if desired.

The index used to select a target address from indirect target buffer 72, the portion of the branch PC used to generate the index, and previous target address information from previous target buffer 74 is provided to indirect silo 78. Silo control circuit 76 receives the IV signal from fetch PC generation unit 18D and, if the signal is asserted, allocates an entry in indirect silo 78 to store the index, branch PC, and previous target address information. Silo control circuit 76 provides a silo number identifying the allocated entry to the instruction processing pipeline of processor 10. The silo number is associated with the predicted indirect branch instruction, to allow for update of indirect branch target predictor 18Ba in the event of a misprediction. For example, the silo number may accompany the predicted indirect branch instruction through the pipeline of processor 10. Alternatively, the silo number may be stored in the entry in PC silo 48 corresponding to the predicted indirect branch instruction.

In the event of a misprediction of an indirect branch instruction, the silo number corresponding to the indirect branch instruction is returned to silo control circuit 76 (Update silo # in FIG. 4). Silo control circuit 76 conveys the index stored in the entry of indirect silo 78 identified by the update silo number to indirect target buffer 72, which receives the update target address. Indirect target buffer 72 stores the update target address into the entry indicated by the update index. In this manner, target addresses generated via execution of indirect branch instructions are stored into indirect target buffer 72, and if the target addresses change for subsequent executions, the target addresses are updated.

Indirect silo 78 may store the previous target address information corresponding to each previously predicted branch instruction represented in previous target buffer 74 when an indirect branch is predicted. In such an embodiment, the previous target address information from the identified indirect silo entry may be copied into previous target buffer 74 in the event of a misprediction. In another embodiment, the previous target address information corresponding to the least recently predicted indirect branch instruction represented in previous target buffer 74 may be stored in the allocated silo entry along with the index generated by index generator circuit 70 and the portion of the branch PC used to generate the index. Such an embodiment may reduce the size of the entries in indirect silo 78. To recover previous target buffer 74 from a misprediction, the stored previous target address information may be stored in the entry of previous target buffer 74 corresponding to the least recently predicted indirect branch instruction (e.g. previous target 1 in FIG. 4), and the exclusive OR (XOR) of the stored previous target address information, the corresponding index, and the corresponding portion of the branch PC may be stored in the other entry. Such an embodiment may be used if index generator circuit 70 uses bitwise XOR to generate the index (e.g. the embodiment shown in FIG. 5 below), since the XOR of the index and the stored previous target address information removes the effects of the stored previous target address information. Additionally, to remove the effects of the branch PC from the index, the branch PC may be XORd with the index and the stored previous target address information. The formulas below illustrate the recovery in more detail, where "PC" is the branch PC, "A" is the previous target address information corresponding to the most recently predicted indirect branch instruction, "B" is the previous target address information corresponding to the predicted indirect branch instruction prior to the most recently predicted indirect branch instruction, and "^" is XOR:

Index=PC^A^B

Prev. Tgt. 0=Index^B^PC=PC^A^B^B^PC=A

It is noted that, while the illustrated embodiment stores the portion of the branch PC, the index, and previous target address information in indirect silo 78, another embodiment may store the portion of the branch PC and the previous target address information but not the index. Such an embodiment may be used, for example, if the portion of the branch PC and the previous target address information is muxed into index generator circuit 70 to generate the update index, or if silo control circuit 76 includes equivalent circuitry to generate the update index.

It is noted that, while the update index and the index are shown separately connected to indirect target buffer 72, indirect target buffer 72 may be a single ported RAM. The index and the update index may be muxed onto the port. It is further noted that indirect silo 78 and silo control circuit 76 may be implemented external to indirect branch target predictor 18Ba. For example, the information stored in indirect silo 78 may be stored in PC silo 48.

It is further noted that, while previous target address information is stored in the present embodiment as history information, other embodiments may use other information. For example, a portion of the PC of each previously predicted indirect branch instruction may be used. Additionally, previous target address information or PC information from all previous branches may be used as history information.

Figure 5:
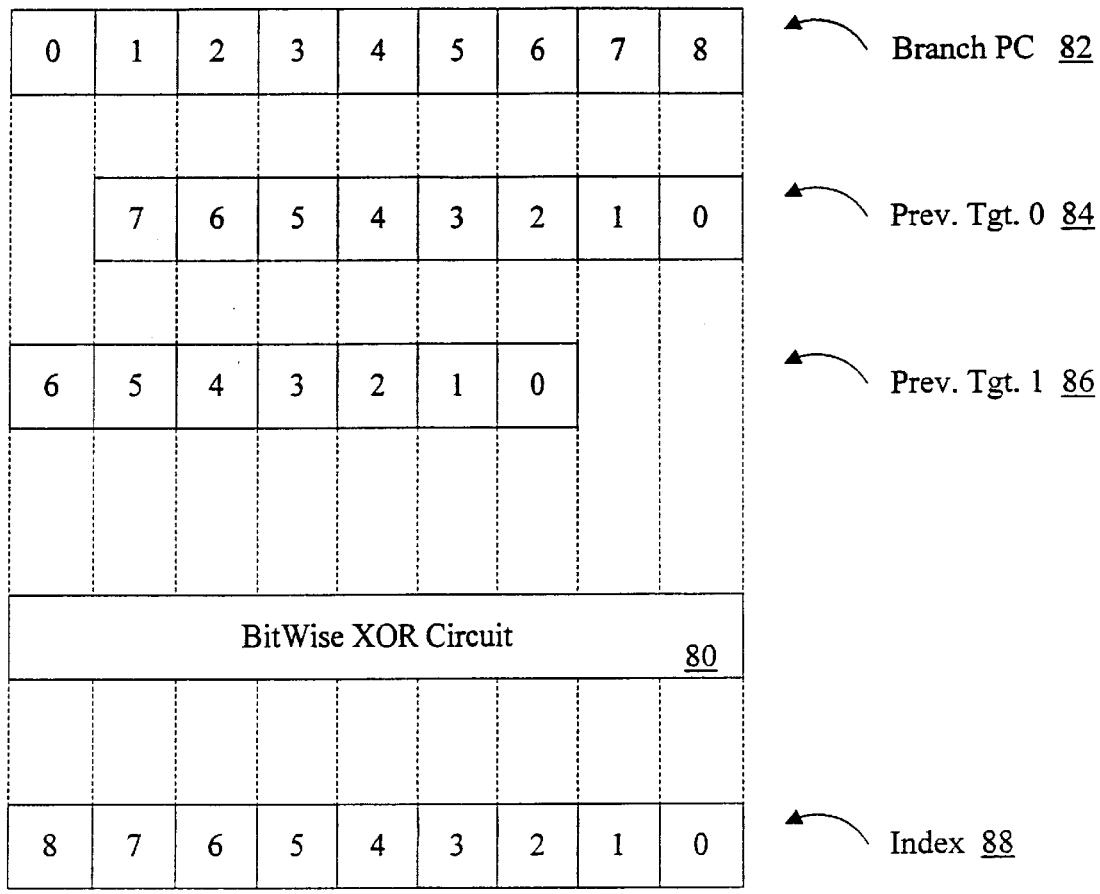
FIG. 5 is a block diagram of one embodiment of an index generator circuit shown in FIG. 4.

Turning now to FIG. 5, a block diagram illustrating one embodiment of index generator circuit 70 is shown. Other embodiments are possible and contemplated. In the embodiment of FIG. 5, index generator circuit 70 may comprise a bitwise exclusive OR (XOR) circuit 80. Bitwise XOR circuit 80 XORs certain bits of various input values to produce each bit of the output (index) value. The vertical dotted lines in FIG. 5 illustrate which bits of the branch PC (reference numeral 82) and the previous target address information (reference numerals 84 and 86) are used to generate each bit of the index (reference numeral 88). The equations below illustrate the function of bitwise XOR circuit 80 for the embodiment shown in FIG. 5, where PC is branch PC 82, tgt0 is previous target address information 84, tgt1 is previous target address information 86, Index is index 88, "^" is XOR, and the bit numbers are provided in square brackets:

Index[8]=PC[0]^tgt1[6]
Index[7]=PC[1]^tgt0[7]^tgt1[5]
Index[6]=PC[2]^tgt0[6]^tgt1[4]
Index[5]=PC[3]^tgt0[5]^tgt1[3]
Index[4]=PC[4]^tgt0[4]^tgt1[2]
Index[3]=PC[5]^tgt0[3]^tgt1[1]
Index[2]=PC[6]^tgt0[2]^tgt1[0]
Index[1]=PC[7]^tgt0[1]
Index[0]=PC[8]^tgt0[0]

The bit numbers illustrated for each value in FIG. 5 illustrate the bit position of the bit within the overall value. Higher numbered bit positions corresponding to more significant bits than lower numbered bit positions within the value. Thus, in the illustrated embodiment, the index is formed using the 9 least significant bits of the branch PC 82, the 8 least significant bits of the target address of the most recently predicted indirect branch instruction (previous target address information 84), and the 7 least significant bits of the target address of the second most recently predicted indirect branch instruction (previous target address previous target address information 86).

As illustrated in FIG. 5, the bit positions of previous target address information 84 are offset with respect to corresponding bit positions of previous target address information 86. By offsetting the bit positions of the previous target addresses, the order of the target addresses may have an effect on the index generated. In other words, if previous target address information 84 is a value "A" and previous target address information 86 is a value "B", the index generated would be different than if previous target address information 84 is the value "B" and previous target address information 86 is the value "A". Therefore, the ordering of the previous target addresses may be more accurately reflected in the generation of index 88. Since the target address generated for a given indirect branch instruction at a given branch PC if the order of previous target address is "A" then "B" may differ from the target address generated if the order of previous target address is "B" then "A", the offsetting of target addresses may lead to more accurate target address prediction by selecting different entries based on the order of the previous target addresses.

Additionally, FIG. 5 illustrates that fewer bits of previous target address information 86 are used than the number of bits used from previous target address information 84. Since previous target address information 84 corresponds to a more recently predicted indirect branch instruction than previous target address information 86, the correlation between previous target address information 84 and the target address actually generated during execution of the indirect branch instruction being predicted may be stronger than the correlation of previous target address information 86 to the target address generated. Viewed in another way, the more distant the previously predicted branch instruction is to the indirect branch instruction being predicted, the less effect the previously predicted branch instruction may have on the outcome of the indirect branch instruction being predicted. Thus, the history information corresponding to the more recently predicted branch instruction is given greater weight (by affecting more bits of the generated index) than the history information corresponding to the less recently predicted branch instruction.

Still further, FIG. 5 illustrates that the bit order of the branch PC 82 is reversed with respect to the previous target address information 84 and 86. For any two bits of previous target address information 84, the more significant bit is used to generate a more significant bit of the index 88 than the less significant bit is used to generate. Similarly, for any two bits of previous target address information 86, the more significant bit is used to generate a more significant bit of the index 88 than the less significant bit is used to generate. On the other hand, for any two bits of branch PC 82, the more significant bit is used to generate a less significant bit of the index 88 than the less significant bit is used to generate. By reversing the bit order of the branch PC (as compared to previous target address information 84 and 86), the least significant bits of the branch PC tend to be combined with the most significant bits of the previous target address information 84 and 86. For instruction code which tends to exhibit locality (i.e. the code executes within a first PC range, then moves on to a second PC range, etc.), the more significant PC bits tend to be relatively stable at any given point in time while the less significant PC bits tend to change from instruction to instruction. Thus, the less significant bits may be viewed as a sort of tag for an indirect branch instruction. By XORing these less significant bits of the branch PC with the stabler more significant bits of the previous target addresses, the indexes generated may tend to be different in the most significant bits for different indirect branch instructions executing within the same PC range. Thus, the incidence of different indirect branch instructions using the same entry in the indirect target buffer may be reduced.

It is noted that the each of the above three index generation techniques (offsetting the bit positions of the history information, weighting the history information by age, and reversing the bit order of the branch PC with respect to the history information) may be used independently. Additionally, any combination of the techniques may be used. Still further, while the present discussion has focused on indirect branch prediction, these techniques may be used with any type of branch predictor which stores branch prediction information in a buffer and indexes the buffer using history information corresponding to preceding branches. As used herein, branch prediction information is information which is used to generate a branch prediction (direction, target address, and/or both) for a branch instruction. For example, branch prediction information may include bimodal counters, previously generated target addresses, etc. History information used to generate the index may include previously predicted target addresses, previous branch instruction PCs, previously predicted directions (taken/not taken), etc.

Figure 6:
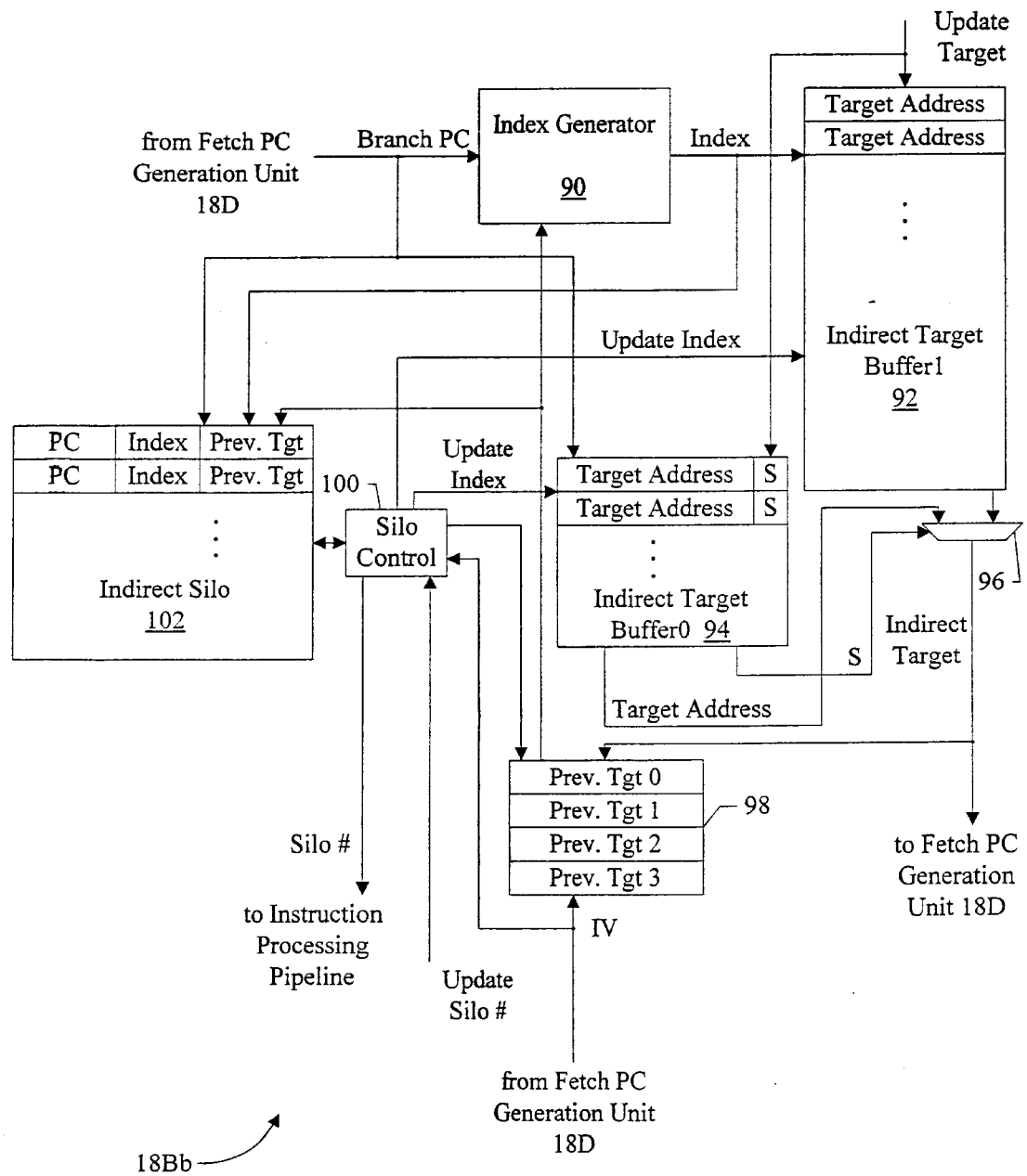
FIG. 6 is a block diagram of a second embodiment of the indirect branch target predictor shown in FIG. 3.

Turning now to FIG. 6, a block diagram of a second embodiment of indirect branch target predictor 18B (indirect branch target predictor 18Bb) is shown. Other embodiments are possible and contemplated. In the embodiment of FIG. 6, indirect branch target predictor 18Bb includes an index generator circuit 90, a first indirect target buffer 92, a second indirect target buffer 94, an indirect target multiplex (mux) 96, a previous target buffer 98, a silo control circuit 100, and an indirect silo 102. Index generator 90 is coupled to receive at least a portion of a branch PC of the indirect branch to be predicted, and is coupled to previous target buffer 98 and to provide an index to indirect target buffer 92 and indirect silo 102. Indirect target buffer 92 is coupled to receive an update target and an update index from silo control circuit 100, and is coupled to indirect target mux 96. Indirect target buffer 94 is coupled to receive the branch PC, an update index from silo control circuit 100, and the update target. Indirect target buffer 94 is coupled to indirect target mux 96. Indirect target mux 96 is coupled to provide an indirect target address to fetch PC generation unit 18D and is coupled to previous target buffer 98. Previous target buffer 98 is coupled to receive an IV signal from fetch PC generation unit 18D and is coupled to silo control circuit 100 and indirect silo 102. Silo control circuit 100 is coupled to indirect silo 102, to provide a silo number to the instruction processing pipeline of processor 10, and to receive an update silo number. Indirect silo 102 is further coupled to receive the portion of the branch PC.

Indirect branch target predictor 18Bb is configured to predict a target address for an indirect branch instruction based on previously generated target addresses. Index generator circuit 90, indirect branch target buffer 92, and previous target buffer 98 may operate in a fashion similar to the description above for index generator circuit 70, indirect target buffer 72, and previous target buffer 74 to provide a first indirect target address prediction to indirect target mux 96. Additionally, indirect target buffer 94 is indexed by a portion of the branch PC and provides a second indirect target address prediction to indirect target mux 96. Furthermore, indirect target buffer 94 provides a prediction selector (S) to indirect target mux 96.

Generally speaking, indirect target buffer 94 may provide a filter for those indirect branch instructions whose target addresses remain relatively fixed during execution. That is, some indirect branch instructions generate the same target address every time they are executed (are almost every time), and thus the history information corresponding to the previous N branch instructions may not be needed to accurately predict these branch instructions. Still further, by using the history information to predict these "fixed target" indirect branch instructions, prediction accuracy may be reduced (since the fixed target indirect branch instructions may still use multiple entries in the history based predictor based on the history, even though the same target address is generated each time). Accordingly, fixed target indirect branch instructions may be predicted using an entry in indirect target buffer 94 (which is indexed by the branch PC directly and thus is unaffected by history information). Indirect branch instructions whose target address changes more frequently may be predicted using entries in indirect target buffer 92 (using history information, and thus allowing for more than one entry to be allocated to each indirect branch instruction).

The prediction selector (S) in each entry determines whether the indirect target prediction from indirect target buffer 92 or from indirect target buffer 94 is used. The prediction selector may, for example, be a bit with one binary state indicating selection of the target address from indirect target buffer 94 and the other binary state indicating selection of the target address from indirect target buffer 92. The selected target address is provided as the indirect target address prediction.

In the event of a misprediction, both indirect target buffers 92 and 94 may be updated with the update target address. Additionally, the prediction selector in the indexed entry of indirect target buffer 94 may be changed to select the opposite one of indirect target buffers 92 and 94 than is currently selected according to the current state of the prediction selector. In the case of the prediction selector being a bit, the bit may be toggled. Other embodiments may employ different prediction selectors. For example, a bimodal counter may be used as the prediction selector to allow some hysteresis in changing the prediction, if desired.

Accordingly, if indirect target buffer 94 is correctly predicting a particular indirect branch instruction, no updates are generated to the indirect target buffer 92 (since updates occur if a misprediction is detected). In this manner, indirect target buffer 94 may filter fixed target indirect branch instructions. If indirect target buffer 94 mispredicts the particular indirect branch instruction, then indirect target buffer 92 is used after the update (along with the history information included in the index to indirect target buffer 92). If indirect target buffer 92 mispredicts, then indirect target buffer 94 is used again, and so on.

Since the fixed target indirect branch instructions may be filtered by indirect target buffer 94, history information corresponding to a larger number of previously predicted indirect branch instructions may be used to index indirect branch target buffer 92. The additional history information may lead to more accurate indirect target address prediction for the indirect branch instructions which are not filtered by indirect target buffer 94, since additional entries in indirect target buffer 92 may be allocated due to the additional history information used. For example, in one embodiment history information corresponding to the four most recently predicted indirect branch instructions may be used, as compared to two in the embodiment shown in FIG. 4. The addition of more history information may result in additional indexes being generated for a particular indirect branch instruction, even though the same branch PC is used (assuming that the particular indirect branch instruction is executed with varying history information, i.e. that various instruction streams, or similar instruction streams with varying indirect target addresses, lead to the particular indirect branch instruction). Other embodiments may use history information from more or fewer previously predicted branch instructions.

In one particular embodiment, indirect target buffer 94 may include 128 entries indexed by the list significant 7 bits of the branch PC and indirect target buffer 96 may include 512 entries. Other embodiments are possible and contemplated. Additionally, similar to the above discussion of FIG. 4, each of buffers 92 and 94 may be tagless, and may be direct mapped. Additionally, each of buffers 92 and 94 may be single ported buffers in which the update index and read indexed are muxed onto the port.

Similar to silo control circuit 76 and indirect silo 78, silo control circuit 100 and indirect silo 102 store information for use in recovering indirect branch target predictor 18Bb for a misprediction. More particularly, the index used to index indirect target buffer 92, the portion of the branch PC, and previous target address information from previous target buffer 98 may be stored into an entry of indirect silo 102 allocated to the indirect branch instruction. A silo number identifying the allocated entry is provided by silo control circuit 100, and is returned to silo control circuit 100 in the event of a misprediction. Silo control circuit 100 may provide the index in the entry identified by the update silo number as the update index to indirect target buffer 92. The update index for indirect target buffer 94 is the least significant bits of the branch PC of the mispredicted indirect branch instruction (provided from the PC field of the entry identified by the update silo number). Furthermore, the previous target address information stored in the entry identified by the update silo number is provided to previous target buffer 98 to restore the previous target address information to a pre-misprediction state.

In one embodiment, the prediction selector corresponding to the indirect branch instruction may be stored in indirect silo 102. In such an embodiment, silo control circuit 100 may update the prediction selector to select the opposite indirect target buffer 92 or 94 and may provide the updated prediction selector to indirect target buffer 94 for storage. By storing the prediction selector in indirect silo 102, indirect branch target predictor 18Bb may generate a correct update even if the indexed entry of indirect target buffer 94 has been overwritten with information corresponding to a different indirect branch instruction. Alternatively, silo control circuit may signal indirect target buffer 94 to change the prediction selector in the identified entry (e.g. toggle the prediction selector, if the prediction selector is a bit).

In another embodiment, indirect silo 102 may store only the previous target address information corresponding to the oldest (least recently predicted) branch instruction represented in previous target buffer 98 along with the index to indirect target buffer 92. Similar to the discussion above with respect to FIG. 4, the previous target address information corresponding to the oldest branch instruction may be stored in one entry of previous target buffer 98 and the XOR of the index, the PC of the mispredicted instruction, and the previous target address information corresponding to the oldest branch instruction may be placed in another entry of previous target buffer 98. The XOR of the index, the PC of the mispredicted instruction, and the previous target address information may provide a value which represents the net effect of XORing the other three previous target address information during the initial prediction of the mispredicted indirect branch instruction. The remaining entries of previous target buffer 98 may be set to zero.

Figure 7:
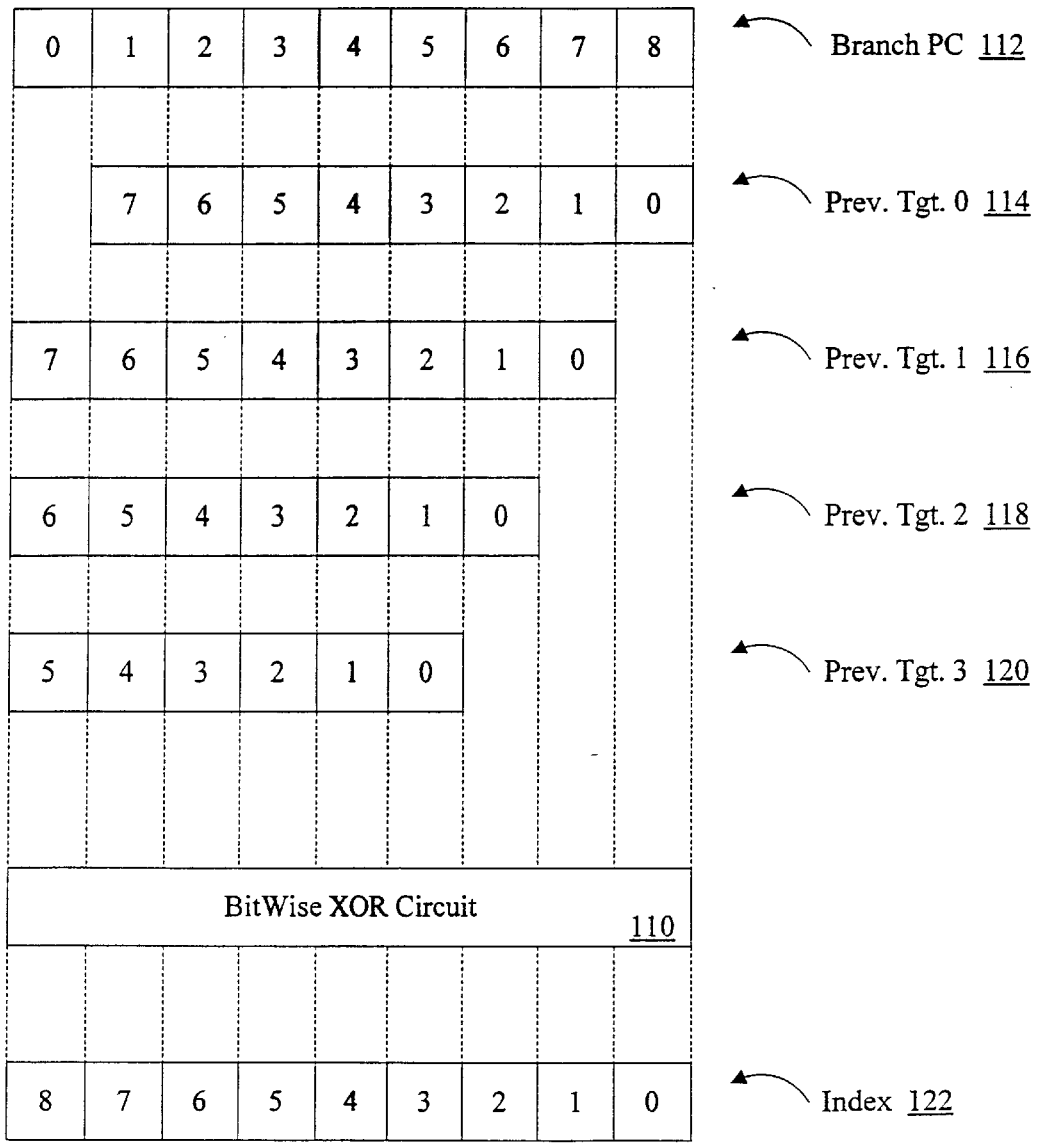
FIG. 7 is a block diagram of one embodiment of an index generator circuit shown in FIG. 6.

Turning now to FIG. 7, a block diagram illustrating one embodiment of index generator circuit 90 is shown. Other embodiments are possible and contemplated. In the embodiment of FIG. 7, index generator circuit 90 may comprise a bitwise exclusive OR (XOR) circuit 110. Bitwise XOR circuit 110 XORs certain bits of various input values to produce each bit of the output (index) value. The vertical dotted lines in FIG. 7 illustrate which bits of the branch PC (reference numeral 112) and the previous target address information (reference numerals 114, 116, 118, and 120) are used to generate each bit of the index (reference numeral 122). The equations below illustrate the function of bitwise XOR circuit 110 for the embodiment shown in FIG. 7, where PC is branch PC 112, tgt0 is previous target address information 114, tgt1 is previous target address information 116, tgt2 is previous target address information 118, tgt3 is previous target address information 120, "Index" is index 122, "^" is XOR, and the bit numbers are provided in square brackets:

Index[8]=PC[0]^tgt1[7]^tgt2[6]^tgt3[5]
Index[7]=PC[1]^tgt0[7]^tgt1[6]^tgt2[5]^tgt3[4]
Index[6]=PC[2]^tgt0[6]^tgt1[5]^tgt2[4]^tgt3[3]
Index[5]=PC[3]^tgt0[5]^tgt1[4]^tgt2[3]^tgt3[2]
Index[4]=PC[4]^tgt0[4]^tgt1[3]^tgt2[2]^tgt3[1]
Index[3]=PC[5]^tgt0[3]^tgt1[2]^tgt2[1]^tgt3[0]
Index[2]=PC[6]^tgt0[2]^tgt1[1]^tgt2[0]
Index[1]=PC[7]^tgt0[1]^tgt1[0]
Index[0]=PC[8]^tgt0[0]

The bit numbers illustrated for each value in FIG. 7 illustrate the bit position of the bit within the overall value. Higher numbered bit positions corresponding to more significant bits than lower numbered bit positions within the value. Thus, in the illustrated embodiment, the index is formed using the 9 least significant bits of the branch PC 112, the 8 least significant bits of the target address of the most recently predicted indirect branch instruction (previous target address information 114), the 8 least significant bits of the target address of the second most recently predicted indirect branch instruction (previous target address information 116), the 7 least significant bits of the target address of the third most recently predicted indirect branch instruction (previous target address information 118), and the 6 least significant bits of the target address of the fourth most recently predicted indirect branch instruction (previous target address information 120).

Similar to the embodiment shown in FIG. 5, the embodiment illustrated in FIG. 7 employs the offsetting of address bits to capture the order of the previous target addresses, weighting older addresses less by using fewer bits of the older addresses, and reversing the bit order of the PC to allow the least significant bits to serve as a sort of tag for the indirect branch instruction. As mentioned above with respect to FIG. 5, each of the above three index generation techniques (offsetting the bit positions of the history information, weighting the history information by age, and reversing the bit order of the branch PC with respect to the history information) may be used independently. Additionally, any combination of the techniques may be used. Still further, while the present discussion has focused on indirect branch prediction, these techniques may be used with any type of branch predictor which stores branch prediction information in a buffer and indexes the buffer using history information corresponding to preceding branches.

Computer Systems

Figure 8:
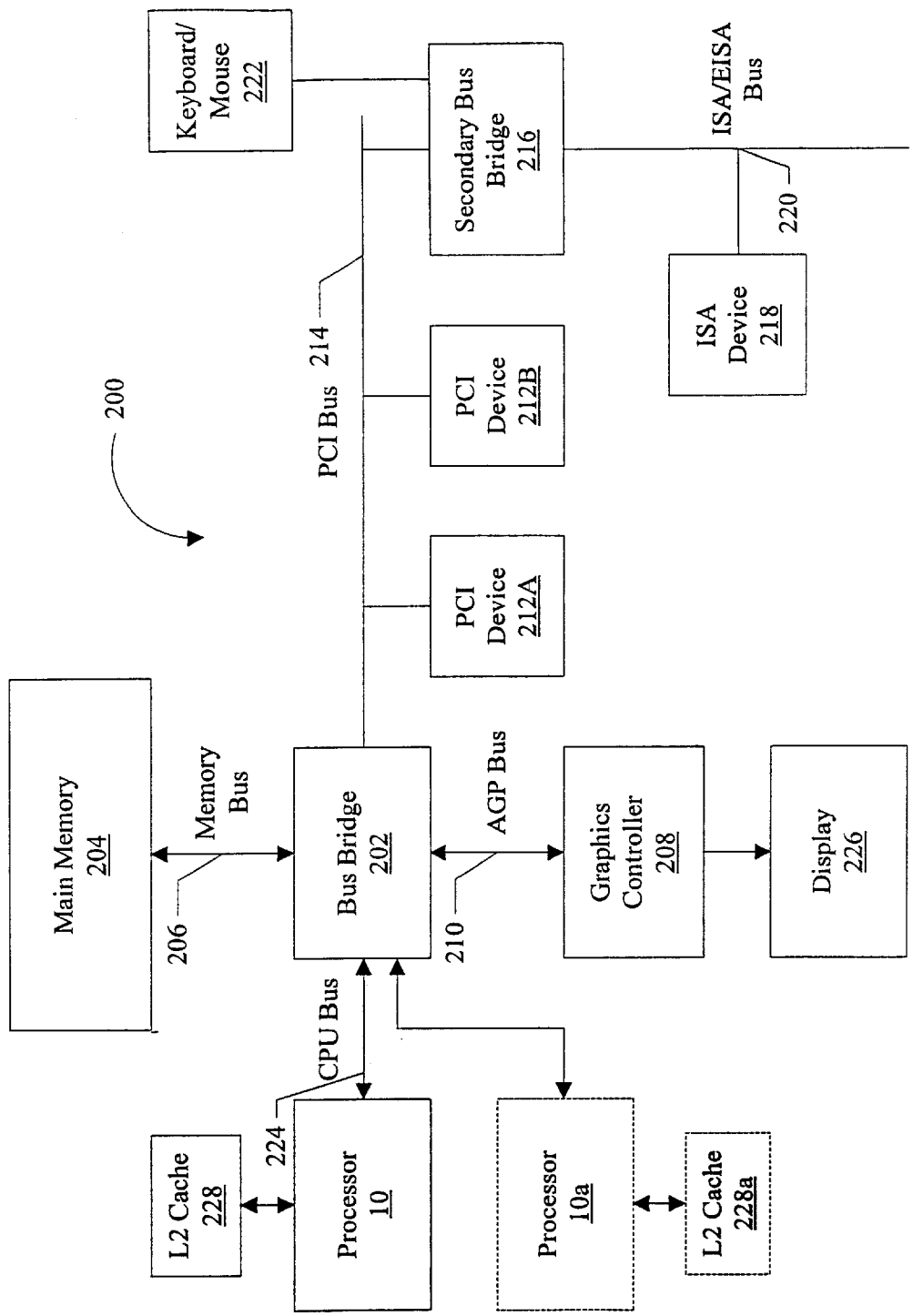
FIG. 8 is a block diagram of one embodiment of a computer system including the processor shown in FIG. 1.

Turning now to FIG. 8, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise external interface 52.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be a copy of processor 10. Processor 10a may be connected to bus bridge 202 via an independent bus (as shown in FIG. 8) or may share CPU bus 224 with processor 10. Furthermore, processor 10a may be coupled to an optional L2 cache 228a similar to L2 cache 228.

Figure 9:
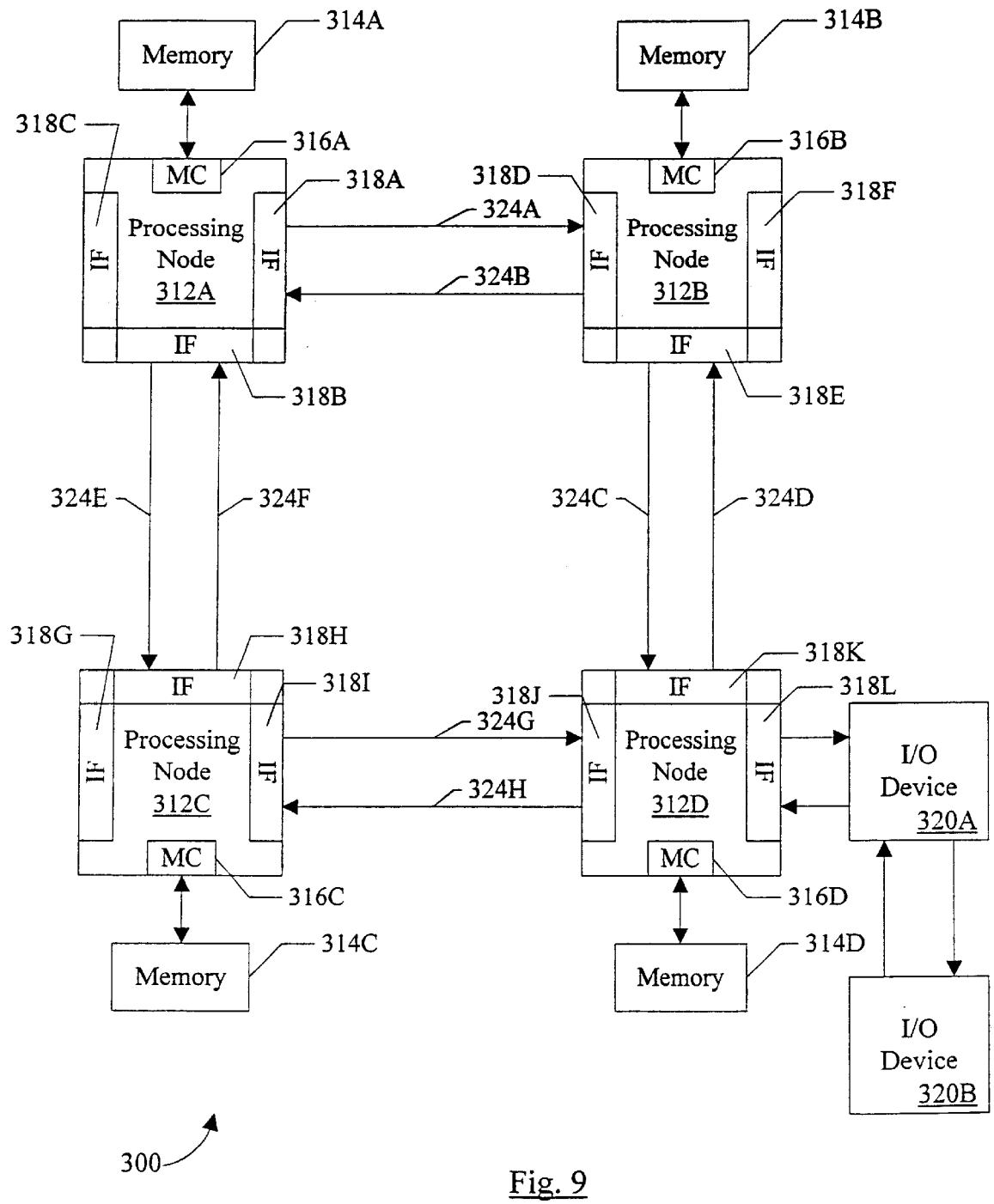
FIG. 9 is a block diagram of a second embodiment of a computer system including the processor shown in FIG. 1.

Turning now to FIG. 9, another embodiment of a computer system 300 is shown. Other embodiments are possible and contemplated. In the embodiment of FIG. 9, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 9. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 9. Any suitable routing algorithm may be used. Other embodiments of computer system 300 may include more or fewer processing nodes then the embodiment shown in FIG. 9.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, a processing node 312A–312D may comprise processor 10. External interface unit 46 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a first buffer configured to store at least a first value corresponding to a first previously predicted branch instruction and a second value corresponding to a second previously predicted branch instruction; and
   an index generator circuit coupled to said first buffer and to receive at least a portion of an instruction address of a first branch instruction, wherein said index generator circuit is configured to generate an index for a second buffer configured to store branch prediction information, said index selecting an entry of said second buffer for predicting said first branch instruction, and wherein said index generator circuit is configured to generate a first bit of said index responsive to a second bit of said first value, a third bit of said second value, and a fourth bit of said instruction address, and wherein said second bit is from a first bit position of said first value and said third bit is from a second bit position of said second value, said second bit position different from said first bit position.

2. The apparatus as recited in claim 1 wherein said first value is at least a portion of a predicted target address of said first previously predicted branch instruction and said second value is at least a portion of a predicted target address of said second previously predicted branch instruction.

3. The apparatus as recited in claim 1 further comprising said second buffer coupled to receive said index from said index generator circuit, wherein said branch prediction information stored by said second buffer comprises a target address.

4. The apparatus as recited in claim 3 wherein said target address was generated via execution of an indirect branch instruction.

5. The apparatus as recited in claim 1 wherein said first buffer is further configured to store a third value corresponding to a third previously predicted branch instruction, and wherein said index generator circuit is configured to generate said first bit of said index further responsive to a fifth bit of said third value, said fifth bit from a third bit position of said third value different than said first bit position and said second bit position.

6. The apparatus as recited in claim 5 wherein said first buffer is further configured to store a fourth value corresponding to a fourth previously predicted branch instruction, and wherein said index generator circuit is configured to generate said first bit of said index further responsive to a sixth bit of said fourth value, said sixth bit from a fourth bit position of said fourth value different than said first bit position, said second bit position, and said third bit position.

7. The apparatus as recited in claim 1 wherein said index generator circuit is configured to generate said first bit by exclusive ORing said second bit, said third bit, and said fourth bit.

8. The apparatus as recited in claim 1 wherein said index generator circuit is further configured to generate another bit of said index responsive to a fifth bit of said first value and a sixth bit of said instruction address, but not responsive to bits of said second value.

9. A method comprising:
   receiving at least a portion of an instruction address of a first branch instruction; and
   generating a first bit of an index to a buffer storing branch prediction information responsive to a second bit of a first value corresponding to a first previously predicted branch instruction, a third bit of a second value corresponding to a second previously predicted branch instruction, and a fourth bit of said instruction address, and wherein said second bit is from a first bit position of said first value and said third bit is from a second bit position of said second value, said second bit position different from said first bit position.

10. The method as recited in claim 9 wherein said first value is at least a portion of a predicted target address of said first previously predicted branch instruction and said second value is at least a portion of a predicted target address of said second previously predicted branch instruction.

11. The method as recited in claim 10 wherein said branch prediction information stored by said buffer comprises a target address.

12. The method as recited in claim 11 further comprising generating said target address via execution of an indirect branch instruction.

13. The method as recited in claim 9 wherein said generating a first bit is further responsive to a fifth bit from a third bit position a third value corresponding to a third previously predicted branch instruction, said third bit position different from said first bit position and said second bit position.

14. The method as recited in claim 13 wherein said generating a first bit is further responsive to a sixth bit from a fourth bit position of a fourth value corresponding to a fourth previously predicted branch instruction, said fourth bit position different from said first bit position, said second bit position, and said third bit position.

15. The method as recited in claim 9 wherein said generating a first bit comprises exclusive ORing said second bit, said third bit, and said fourth bit.

16. The method as recited in claim 9 further comprising generating another bit of said index responsive to a fifth bit of said first value and a sixth bit of said instruction address, but not responsive to bits of said second value.

* * * * *